Patented May 26, 1942

2,284,461

UNITED STATES PATENT OFFICE 2,284,461

MANUFACTURE OF AMINO-CYCLIC SULPHONAMIDES AND THEIR DERIVATIVES

Bertold Paul Heinrich Wiesner and Ernst Katscher, London, England, assignors to Ward Blenkinsop and Company, Limited, Halewood, near Liverpool, England, a British company No Drawing. Application August 23, 1940, Serial No. 353,986. In Great Britain September 1, 1939

6 Claims. (Cl. 260—288)

This invention relates to improvements in or relating to the manufacture of amino cyclic sulphonamides and especially of amino aromatic sulphonamides containing one or more heterocyclic radicals in the sulphonamido group.

It is already known that amino aromatic sulphonamides may be obtained by condensing an acylated amino aromatic sulpho-chloride with an appropriate amino compound, and by employing a suitable heterocyclic amino compound, amino aromatic sulphonamides containing heterocyclic radicals in the sulphonamido group have been produced, it having been necessary after the condensation to split off the acyl group which originally protected the amino group of the sulphochloride.

It has now been found that para amino benzene sulphonamides containing one or more heterocyclic radicals in the sulphonamido group can be readily prepared by the action of a para-amino-benzene-sulphonyl-fluoride on primary or secondary amines of heterocyclic or condensed hetero-cyclic compounds or upon derivatives thereof. Ring substituted derivatives of para-amino-benzene sulphonyl fluoride may be also be used, whilst amino pyridines, amino quinolines, amino isoquinolines amino thiazols may be mentioned as examples of some of the amino heterocyclic compounds which may be employed.

It is an important advantage, and indeed an essential characteristic of the present invention that the amino group in the para position to the reactive sulphonyl group is left free and unprotected, which renders unnecessary the protection of this group and the subsequent splitting off of the protective group.

A further advantage of the use according to the present invention of amino benzene sulphofluorides arises from the greater stability of these compounds as compared with the amino benzene sulphochlorides some of which are not or are not readily obtainable. Owing to this greater stability they may carry a greater number of substituents, and it should be understood that the reaction is not restricted to the use of para-amino-benzene sulphofluoride itself with amines of heterocyclic compounds. It is equally possible to carry out the reaction with substances in which substitution has been carried out in one or more positions of the benzene ring and/or of the heterocyclic ring or ring system. Moreover, to the sulphonamido group can be attached either an alkyl an aryl or an aralkyl group or a further heterocyclic ring or ring system or an acyl group or one of these groups itself substituted in a suitable manner. It is also possible to introduce one or more of the radicals already mentioned into the amino group after the condensation has been carried out. The substituents may be present in the reactive compounds before the condensation, or they may be introduced after the condensation has been carried out. The amino group attached to the nucleus may itself be substituted by a benzene sulphonamido group.

The compounds prepared according to the present invention are of considerable therapeutic interest.

The condensation may be carried out in the presence of any suitable solvents and/or catalysts such for example as tertiary amines such as dimethyl aniline and/or an excess of the reactive heterocyclic compound. In some cases it may be advantageous to employ one of the reactants in excess as a medium in which to carry out the condensation.

The para-amino benzene sulpho-fluoride may be prepared in any known and/or convenient manner, for example, by a suitable and obvious modification of the method indicated in German specification No. 633,025 by the action of fluorsulphonic acid on amino benzene sulphonic acid.

In order that the invention may be well understood, the following examples of how it may be carried out are given as illustrations only.

Examples 1. 3.5 grammes of para-amino-benzene-sulphofluoride and 1.9 grms. alpha amino pyridine are dissolved in 10 grammes dimethyl aniline, and the mixture is heated for 3 hours to a temperature of 180° C. The mixture is allowed to cool at the end of this period when para-aminobenzenesulphon-2-pyridin-amide separates out in the form of crystals. These crystals are obtained by filtration and washed with benzene. They are then purified by methods known per se.

2. 40 grammes of molten 2-amino-pyridine are heated to a temperature of 185° C. over a period of 2 hours. 10 grammes of para amino benzene sulphofluoride are added to the amino pyridine, in small portions and under occasional shaking. The mixture is then heated for a further 8 hours to a temperature of 180° C. It is then allowed to cool to a temperature of 60–80° C. and 8 c. c. of water are added. When allowed to cool further crystals separate out, which are obtained by filtration, and rapidly washed with water. This crude product is recrystallised from boiling dioxan, if necessary with the addition of activated carbon. The resulting product has a melting point of 190–191° C., and chemically is definable as para-aminobenzenesulphon-2-pyridine amide. The aqueous solution retains excess pyridine, and a further product of the reaction which is maintained in solution by the amino pyridine. The aqueous mother liquors and washing fluids are combined and 15 cc. of a 40% solution of sodium hydroxide are added. The resulting mixture is extracted with ether, and in this manner the excess amino pyridine is recovered. The aqueous residue is neutralised by addition of dilute hydrochloric acid. At a pH of 11 to 10, a flocculent material separates, which is rejected. At a pH of 8.5 to 8, a substance separates out which can be recrystallised from dioxan, having a melting point of 235–237° C., and of the following constitution

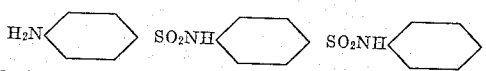

3. 7.4 grammes of amino methyl thiazole are melted together with 2.4 grammes para amino benzene sulphofluoride and the melted mixture is heated for several hours to 130° C. After cooling, the reaction mixture is treated with an aqueous solution of sodium hydroxide. By extraction with ether, excess amino methyl thiazole is recovered from the mixture. After extraction with ether the aqueous solution is gradually neutralised with dilute hydrochloric acid. In the first stages of the neutralization, a dark coloured impurity is precipitated and removed by filtration. On addition of further hydrochloric acid a crystalline powder separates and is obtained by filtration. This powder is then recrystallised from dioxan, with the addition of activated carbon, and has a melting point of 242–244° C. It constitutes para-aminobenzene-sulphon-4-methyl-2-thiazolamide.

We claim:

1. The process which comprises reacting a para-amino-benzene-sulphofluoride, the amino-group of which is unsubstituted, with a heterocyclic amine having at least one free amino hydrogen.

2. The process which comprises reacting a para-amino-benzene-sulphofluoride, the amino-group of which is unsubstituted with a heterocyclic amine having at least one free amino hydrogen in the presence of a solvent for the reactants and then recovering the reaction product therefrom.

3. The process which comprises reacting a para-amino-benzene-sulphofluoride, the amino-group of which is unsubstituted, with a heterocyclic amine having at least one free amino hydrogen in the presence of a solvent for the reactants at a temperature of about 130° C. and then recovering the reaction product therefrom.

4. The process as in claim 1 wherein the heterocyclic amine is an amino pyridine.

5. The process as in claim 1 wherein the heterocyclic amine is an amino quinoline.

6. The process as in claim 1 wherein the heterocyclic amine is an amino thiazole.

BERTOLD PAUL HEINRICH WIESNER.
ERNST KATSCHER.